United States Patent [19]
Didelot et al.

[11] Patent Number: 5,626,699
[45] Date of Patent: May 6, 1997

[54] PROCESS FOR THE PRODUCTION OF AN ASYMMETRIC LAMINATED PANE BY CALENDERING

[75] Inventors: Claude Didelot, Thourotte; Jean Ducret, Clairoix; Edouard Kadzialka, Ribecourt, all of France

[73] Assignees: Saint-Gobain Vitrage, Courbevoie, France; Asahi Glass, Tokyo, Japan

[21] Appl. No.: 567,737

[22] Filed: Dec. 5, 1995

Related U.S. Application Data

[63] Continuation of Ser. No. 350,887, Dec. 7, 1994, abandoned.

[30] Foreign Application Priority Data

Dec. 7, 1993 [FR] France ................... 93 14661

[51] Int. Cl.$^6$ .............................................. B32B 31/20
[52] U.S. Cl. ........................ 156/99; 156/238; 156/249; 156/273.1; 156/542
[58] Field of Search ......................... 156/540, 541, 156/542, 99, 102, 104, 106, 238, 249, 273.1, 242, 555

[56] References Cited

U.S. PATENT DOCUMENTS

| | | | |
|---|---|---|---|
| 4,244,465 | 1/1981 | Hishikawa et al. | 198/691 |
| 5,176,776 | 1/1993 | Moncheaux et al. | 156/238 |

FOREIGN PATENT DOCUMENTS

| | | | |
|---|---|---|---|
| 0403321 | 12/1990 | European Pat. Off. | |
| 2607436 | 6/1988 | France | |
| 2159763 | 12/1985 | United Kingdom | 156/249 |

*Primary Examiner*—Michael W. Ball
*Assistant Examiner*—Sam Chuan Yao
*Attorney, Agent, or Firm*—Oblon, Spivak, McClelland, Maier & Neustadt, P.C.

[57] ABSTRACT

A process and a device for making asymmetric laminated panes composed of a support and at least one sheet of plastic material by calendaring. A blank sheet of plastic material (15) is brought into contact with the support (11) to be covered by an endless conveyor belt (16). The blank sheet is released progressively so as to bring it into contact with the support (11) just before the pressing passage (3), as the laminated assembly passes into and through the pressing passage.

8 Claims, 1 Drawing Sheet

PROCESS FOR THE PRODUCTION OF AN ASYMMETRIC LAMINATED PANE BY CALENDERING

This application is a Continuation of application Ser. No. 08/350,887, filed on Dec. 7, 1994, now abandoned.

BACKGROUND OF THE INVENTION

1. Field of the Invention

This invention concerns the manufacture of laminated panes of the type known as asymmetric, composed of a monolithic or laminated rigid support and of a sheet of flexible plastic material having the desired properties, such as energy-absorber properties, surface properties such as scratch resistance, abrasion resistance and so on.

2. Discussion of the Background

Asymmetric panes composed of a monolithic or laminated rigid support and a flexible sheet of plastic material, such as at least one film of polyurethane, may be used as vehicle panes, notably as windscreens, lateral panes or rear windows for automobile vehicles; as panes for aircraft cockpits; as panes for trains or as panes of buildings and ships.

The assembling of the rigid support with the flexible sheet to form the laminated pane is generally performed by a preliminary pressing together of the support and the sheet by calendering, followed by an autoclave cycle using temperature and pressure which improves the bond between the constituent elements and thus assures the final assembling together.

There has already been proposed, in European Patent Publication 0 015 209, a calendering device comprising lower pressing elements, such as a series of small rollers or wheels disposed alongside one another, and upper pressing elements comprising a flexible cylindrical pressing roller extending over a length at least equal to the width of the elements to be assembled. The flexible roller is held to the desired curvature by upper members bearing upon it and the entire assembly of the pressing elements is mounted upon a pivoting frame.

The flexible sheet which is assembled with the rigid support by the use of this device must be in the form of a continuous band or ribbon so that it can be held in the desired position for assembly, which is carried out as the components move past.

Unfortunately, in this type of assembling with the components in motion, it is not possible to present the rigid supports for assembly, one after another and without gaps between them, especially in the case of panes curved in the direction of travel, which generally corresponds to the curvature along the length of the pane. The pivoting frame is therefore progressively tilted as the pane advances between the pressing elements, in order to ensure a pressing action substantially perpendicular to the surface of the pane throughout the entire operation.

The position of the pivoting frame as a pane departs therefrom is generally symmetrical, about a vertical plane, with the position of the pivoting frame as a pane enters therein, which means that between the departure of one pane and the entry of the next pane the frame must tilt in the reverse direction in order to return to its initial position for the start of assembly.

It is therefore necessary to separate two consecutive rigid supports by a gap at least equal to the distance corresponding to the advance of the panes during the time for tilting back of the frame. This interval therefore corresponds to a loss of flexible sheet material.

Furthermore, in the case of automobile panes, the developed surface of the pane has an approximately trapezoidal shape, which leads to other losses of flexible sheet material, in particular the entire part contained between the contours of the trapezium, which is termed the blank sheet, and the rectangle within which the blank sheet is inscribed. The various losses of material may in total amount to approximately 30% of the area of the sheet.

In Publication EP-A-0 403 321, a method has been proposed for the assembly of asymmetric panes composed of a rigid support and a flexible sheet, starting from a continuous ribbon or band, which greatly reduces the wastage of flexible sheet material.

According to this process, there is presented to the assembling device a continuous band formed of a flexible support film of paper or of an inexpensive plastic material, on which there have been placed blank sheets prepared or cut out in advance to the desired geometrical shape, these blank sheets being arranged uniformly and separated from one another. In general, the separation distance between two blank sheets is at least equal to that corresponding to the advance of the film during the period taken by the assembling device for passing from the discharge position for a pane to the entry position for the next pane.

The time taken by the device for changing position corresponds to the time for return pivoting when the device is equipped with a tilting frame.

For forming this prefabricated flexible band or ribbon, several variants are envisaged. In a first embodiment, the sheet of plastic material may be produced by format, using as a shaping support a continuous bed composed of trapeziums disposed head-to-tail. When the sheet of plastic material is removed from the shaping support, the trapezoidal blank sheets are directly obtained. These are then placed uniformly and with a single orientation on the support film to form the prefabricated band, which will be used for the later assembly by calendering.

In a variant, the flexible sheet is produced by using a continuous shaping support of glass or of metal, as described for example in French Patent Publications 2 230 487 or 2 549 414, or on a tensioned flexible support as described for example in French Patent Publication 2 480 669. The sheet of continuous plastic material produced in this manner is cut into blanks after having been pulled off the shaping support or cut out together with the support itself when the latter is a tensioned flexible support and forms part of the manufactured sheet, which is then a composite sheet. The blanks obtained are then disposed as before in a uniform manner and in a single orientation on the support film in order to form the prefabricated band which will be used for assembly.

The process described above thus enables the losses of material to be limited. It does, however, require the production in advance of a continuous band from a flexible support film and cut-out blanks. After assembly, the support film is generally lost to the process.

SUMMARY OF THE INVENTION

It is an object of the present invention to provide a new process for assembling, by calendaring, a blank sheet of flexible plastic material and a rigid support which greatly reduces the wastage of flexible plastic material and which uses a reusable support in the form of an endless belt for bringing the blanks to the assembling device.

According to the process of the invention, the blank sheet is placed on an endless conveyor belt, disposed upstream of a pressing passage. The blank is brought by this belt into proximity to the pressing passage, above the support to be covered and which travels at the same speed as the blank. The front end of the blank is released and then the entire blank is progressively released to bring it into progressive contact with the support to be covered just upstream of the pressing passage, as the support-blank assembly passes through the pressing passage.

The release of the front end of the blank is, according to one embodiment of the invention, obtained by passing the endless belt around a convex curve of small radius, disposed just upstream of the pressing passage. The characteristics of the convex curve around which the endless belt passes, in particular the radius of curvature ensuring release of the blank, depends primarily upon the nature of the adhesion force of the blank to the endless belt, upon the geometry of the blank, and upon its thickness, which is associated with its weight. It may be generally considered that the radius of curvature should be less than 10 mm, preferably less than 5 mm and advantageously between 1 mm and 5 mm in the case of a blank of plastic material formed of at least one layer of polyurethane, as described above, having the geometry and the approximate dimensions of a blank for automobile windscreen, and being approximately 0.5 to 1.5 mm thick.

The lower limit of the adhesive force of the blank sheet to the conveyor belt is determined by the force necessary for holding the blank in contact with the conveyor belt while it is being brought to the assembling position, the blank being disposed underneath the conveyor belt. This adhesive force must therefore be greater than the weight of the blank. On the other hand, the upper limit of the adhesive force is the force necessary for the release of the blank at least at its front end while the conveyor belt is passing around the small radius of curvature disposed just upstream of the pressing passage.

The bond between the conveyor belt and the blank can be achieved by different means. These means may be means creating electrostatic forces, suction forces or chemical adhesion forces, depending upon the nature and type of the endless belt used. In the case of a belt which is non-porous to air, the adhesion is advantageously an adhesion due to electrostatic forces. In this way an electrostatic adhesion is created between the endless belt and the blank along the path corresponding to the conveying of the blank to the calendering position.

One of the advantages of electrostatic adhesion is that this adhesion can be created or destroyed, as desired, without altering the surface state of either the conveyor belt or the blank.

According to one characteristic of the process according to this invention, the blank sheet is placed on the endless belt and an adhesion is electrostatically created just afterwards.

In a variant according to this invention, the endless belt used may be a cloth porous to air. It may then be associated with depression or suction means in order to assure the holding of the blank in contact with the belt during its transfer to the calendering position.

The adhesion between the blank and a porous endless belt may also be adhesion due to electrostatic forces. It is also possible to combine electrostatic adhesion with holding by suction.

As described earlier, the release of the blank, in particular the front part thereof, may be achieved by passing the belt around a convex curve of small radius. Other means for release of the blank at the desired position just upstream of the pressing passage are possible. These means will depend on the type of adhesion used for holding the blank to the endless belt and may consist of means capable of suppressing the forces holding the blank in contact with the belt.

When the adhesion is due to electrostatic forces, the release of the blank may, as noted above, be performed by passing the endless belt around a convex curve of small radius, or by eliminating the electrical attraction forces by the use of means such as an electrostatic discharge bar, or by combining these mechanical and electrical release means.

When the endless belt is porous to air, other release means may be used either alone or in combination with the means described above. These means may act to modify the forces which act upon the two faces of the blank, for example by suppression of suction or by blowing of air from the endless belt towards the blank.

The invention also concerns a device for the assembling by calendaring of asymmetric panes formed of a support, in particular a rigid support, and of a sheet of plastic material.

The device according to this invention is an assembly line which comprises a calenderer equipped with upper pressing means and lower pressing means, mounted preferably on a pivoting frame, a conveyor for bringing the support to be covered to the calenderer and means for bringing the blank of plastic material to be assembled with the support just upstream of the pressing passage and for depositing it on the support, progressively as it is engaged in the pressing passage. The means for bringing the blank of plastic material to be assembled with the support just upstream of the pressing passage comprises an endless conveyor belt and means for releasing the front end of the blank at the desired position. A downstream conveyor removes the assembly thus produced.

The device also comprises means for giving to the endless belt properties for the holding or the adhesion of the blank and means for synchronizing the movement of the endless belt and the movement of the conveyor for the support to be covered, in order to bring the blank and the support to be covered simultaneously and at the same speed to the pressing passage.

The means for releasing the blank from the conveyor belt are, according to one characteristic of the invention, a curve of small radius around which the endless belt passes. The means for releasing the blank may also be other means for suppressing the adhesion of the blank to the endless belt. These means may be mechanical and/or electrical.

At the location at which the release of the blank is performed, the belt has a winding angle $\alpha$ (or return angle) generally greater than 90° and preferably greater than 135°, so as to facilitate the release of the blank and in order not to limit the effective zone of action of the calenderer, in particular the inclination of the pivoting frame.

The calenderer is, for example, that described in European Patent Publication EP-A-0 015 209 or in European Patent Publication EP-A-0 189 345.

BRIEF DESCRIPTION OF THE DRAWING

Other advantages and characteristics of the invention will be apparent from the following description, referring to FIG. 1 which schematically shows an assembly line according to this invention, including an endless belt for bringing the blank onto the support to be covered just upstream of the assembly passage.

DETAILED DESCRIPTION OF THE PREFERRED EMBODIMENT

Figure 1:
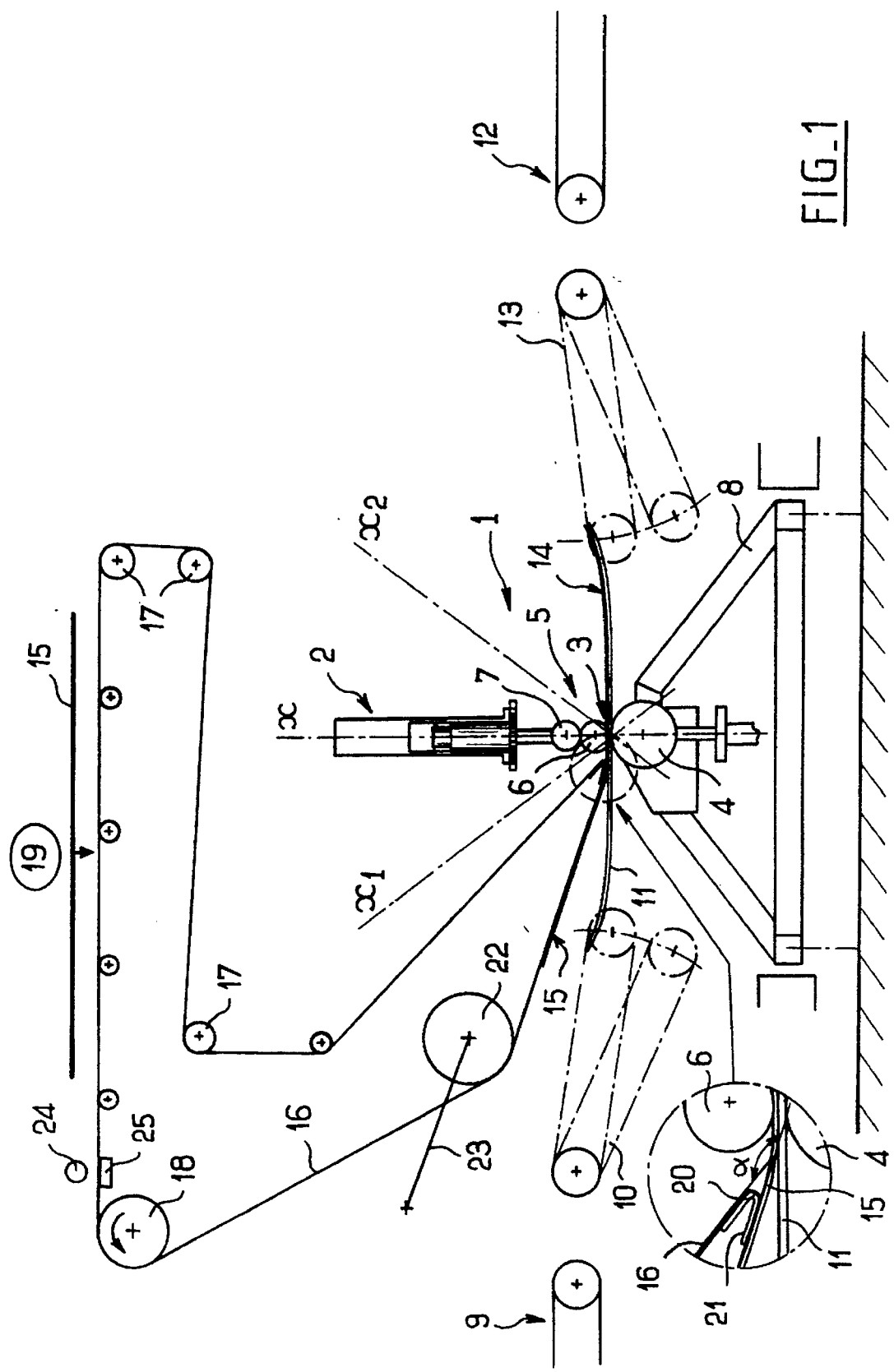

The assembly device comprises a calenderer 1 such as that described for example in European Patent Publication EP-A-0 015 209, already mentioned. The calenderer 1 comprises a frame 2 which can pivot between the positions $x_1$ and $x_2$ about a horizontal axis disposed transversely to the assembly line. This pivoting frame 2 carries lower pressing means 4 constituted of a series of small rollers and upper pressing means 5 comprising a flexible cylindrical pressing roller 6 and a series of upper small rollers 7 bearing upon it to give it the desired curvature, e.g., the transverse curvature of the panes to be assembled.

The pressing means may be controlled according to the principle of the calenderer known as a floating calenderer, according to which the pressure forces acting on the upper small rollers balance the pressure forces acting on the lower small rollers as a result of a communication between the pressure chambers of the jacks acting upon the upper small rollers and the pressure chambers of the jacks acting upon the lower small rollers. A calenderer of this type is described in European Patent Publication EP-A-0 189 345. The movable frame is mounted on a machine frame 8.

The calendaring device is disposed between an upstream belt conveyor 9 formed of several parts, including an end part 10 which supplies the support to be covered, generally a curved glass sheet 11, and a downstream conveyor 12 formed of several parts, including an end part 13 which receives and removes the covered supports constituting the assemblies or laminated panes 14. The end part 10 of the upstream conveyor and the end part 13 of the downstream conveyor may be variably inclined to the horizontal between the positions shown in dot-and-dash lines in order to feed and to receive the front edge of the supports to be covered 11 substantially perpendicularly to the pivoting frame without the need to incline this frame excessively.

The blank 15 to be assembled, together with the support 11, is brought to the pressing passage by an endless conveyor belt 16 held tensioned by passing around rollers 17 and driven by a driving roller 18. The endless conveyor belt passes by a station 19 where the blank is deposited from above onto the belt. The belt also passes by a location disposed in proximity to the entry end to the pressing passage and provided for the release of the blank. To do this, the endless belt 16 passes, at this location, around a convex curvature of small radius 20, for example 3 mm, formed by the rounded base of a V-shaped metal guide piece 21. This guide piece is electrically connected to earth in such a way as to eliminate, at least partly, the electrical charges carried by the endless belt. This guide piece thus fulfills the function of a discharge bar. At the location at which the deposition of the blank takes place, upstream of the pressing passage, the belt has a winding angle α around the base of the guide piece, this angle advantageously exceeding 90° and preferably exceeding 135°, so as to ensure the detachment of the blank from the endless belt and to enable the working area of the pivoting frame of the calenderer to be kept clear.

The tensioning of the belt to the desired value is assured by a roller 22, the position of which can be adjusted by an articulated arm 23. Downstream from the blank deposition station 19, the belt passes underneath and at approximately 10 mm from a charging electrode 24 intended for creating electrostatic adhesion forces between the belt and the blank. A suitable charging electrode is, for example, a charging electrode sold commercially by the French company ELCOWA, which can be supplied at high voltage between 9,000 and 15,000 volts, and which extends across the entire width of the belt. An earth metal plate 25 may be disposed on the opposite side of the belt relative to the charging electrode 24 and in contact with it.

The deposition of the blank onto the belt is performed by means, not shown, such as an automatic controller arm. The deposition of the blank may be carried out as the belt moves past. In a variant, deposition could be performed when the belt is stopped, provided that at the instant of stopping another blank is not being assembled with the support at the assembling station.

The device is provided with reference means, detectors, and synchronization means (not shown) so that the support to be covered and the blank arrive at the same time at the entry to the pressing passage.

The device may also comprise monitoring and regulation means (not shown) to prevent the belt from running incorrectly around the rollers.

The endless belt in this embodiment is formed of a material capable of electrostatic adhesion to the blank, and sufficiently flexible to be able to pass around a curve of small radius. This belt may be of a polyurethane having a smooth surface on the conveying side. The thickness of the belt is, for example, 0.7 mm.

The device functions as follows. With the belt continuously running, the arm of an automatic controller disposed at the deposition station 19 places the blank sheet 15 onto the endless belt in the desired position relative to the position for later assembly. The belt and the blank pass beneath the charging electrode 24 and an electrostatic adhesion is created between it and the endless belt.

One or more detectors detect the position of the blank. The support, for example a glass sheet, is brought in a synchronized manner by the conveyor to the calenderer. The glass sheet and the blank arrive at the same time in the zone located just upstream of the pressing passage. When the front end of the blank arrives at the position of the V-shaped metal guide piece 21, the front end of the blank becomes detached and falls so as to come into contact with the front edge of the glass sheet which is travelling at the same speed as the blank. With the movable frame inclined to position $x_1$ towards the upstream conveyor, the two constituent elements of the pane are seized, just after they come into contact, by the pressing means. As the pane advances through the calenderer, the blank becomes progressively detached from the continuous belt by being pulled by the upper driving pressing roller 6, to become finally assembled with the glass sheet.

It may be noted that, to ensure functioning of the device according to this invention, it is sufficient for only the front end of the blank to become detached from the endless belt as it passes around the V-shaped guide piece. Once this front part has passed through the passage of the calenderer, the upper pressing roller applies a pull to the blank, which causes release of the remainder of the blank.

During assembling, the support is driven by the lower small rollers 4 and the blank by the flexible pressing roller 6 which, under the action of the upper small rollers 7, presses the blank at all points onto the support. At the same time as it is assembled with the support to be covered, the blank becomes detached from the continuous belt.

As the frame pivots, it reaches the vertical position corresponding to one-half of the assembling operation as shown in FIG. 1, and then inclines progressively towards the downstream conveyor, until the position referenced $x_2$ is reached.

At the exit from the assembling device, the projecting parts of the blanks are cut back to the contours of the glass sheet.

The process and the device according to this invention are used with advantage for assembling laminated panes of the type termed asymmetric, composed of a monolithic or laminated support of glass and/or of plastic material and of a flexible sheet of plastic material. The support is generally constituted of an annealed or toughened glass sheet, while the sheet of flexible plastic material is generally constituted of at least one polyurethane film. The sheet of plastic material may comprise a polyurethane film having energy-absorber properties and a polyurethane film having surface properties, such as scratch resistance, abrasion resistance, and resistance to external agents, advantageously a thermo-setting (or cross-linked) polyurethane, this latter film being disposed in contact with the endless belt. The opposite film, intended to come into contact with the support, has properties of adhesion to the support. This adhesive film may be a film having energy-absorption properties or a supplementary adhesive film of thermoplastic polyurethane, for example.

Panes and polyurethane sheets of these types are described, for example, in the Patent Publications FR-A-2 398 606, EP-0 190 517, EP-A-0 132 198, JP-A-86 171241 and JP-A-86 281118.

The laminated pane may subsequently be subjected to a definitive assembling cycle, for example an autoclave cycle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for assembling a blank sheet of plastic material with a rigid support for the purpose of forming a laminated pane, comprising the steps of:

bringing the support to be covered to an upstream end of a passage between rollers of a calenderer;

electrostatically adhering a blank sheet onto an endless conveyor belt which travels at the same speed as the support to be covered;

using the endless conveyor belt to bring the blank sheet above, and into contact with, the support to be covered so as to form an assembly of the blank sheet and the support to be covered;

progressively separating the blank sheet from the endless conveyor by passing the conveyor belt around an electrically grounded guide member having a curve of small radius; and pressing the assembly of the support and the blank sheet in contact therewith in the passage between the rollers as the assembly passes through the passage between the rollers.

2. The process according to claim 1, wherein said step of progressively separating the blank sheet from the endless conveyor comprises passing the endless belt around a convex curve of small radius.

3. The process according to claim 2, wherein the radius of the convex curve is less than 10 mm.

4. The process according to claim 2, wherein the radius of the convex curve is less than 5 mm.

5. The process according to claim 1, wherein the blank sheet comprises at least one polyurethane film.

6. The process according to claim 1, wherein the blank sheet comprises at least one film of polyurethane having energy-absorbing properties and another film of polyurethane having surface properties, the another film being in contact with the endless belt, the at least one film, intended to come into contact with the support, having properties of adhesion to the support.

7. The process according to claim 6, wherein the another film possesses one of energy absorber properties and a supplementary adhesive film of thermoplastic polyurethane.

8. Process according to claim 1 wherein the support is glass.

\* \* \* \* \*